United States Patent [19]

Nakamura et al.

[11] Patent Number: 4,560,719

[45] Date of Patent: Dec. 24, 1985

[54] FLAME RETARDANT POLYOLEFIN-BASED RUBBER COMPOSITION

[75] Inventors: Tsutomu Nakamura; Kunio Itoh, both of Gunma, Japan

[73] Assignee: Shin-Etsu Chemical Co., Ltd., Tokyo, Japan

[21] Appl. No.: 705,564

[22] Filed: Feb. 26, 1985

[30] Foreign Application Priority Data

Feb. 27, 1984 [JP] Japan .................. 59-35724

[51] Int. Cl.⁴ .............................................. C08K 3/22
[52] U.S. Cl. ........................... 524/269; 524/80;
524/262; 524/263; 524/264; 524/412; 524/413;
524/424; 524/436; 524/437
[58] Field of Search ............... 524/80, 262, 263, 264,
524/269, 412, 413, 424, 436, 437; 523/205

[56] References Cited

U.S. PATENT DOCUMENTS

| | | | |
|---|---|---|---|
| 3,382,196 | 5/1968 | Gowdy et al. | 524/269 |
| 3,795,646 | 3/1974 | MacKenzie et al. | 524/269 |
| 3,900,441 | 8/1975 | King | 524/424 |
| 3,931,081 | 1/1976 | Davy et al. | 524/168 |
| 4,012,343 | 3/1977 | Raley | 524/80 |
| 4,067,847 | 1/1978 | Yui et al. | 524/436 |
| 4,147,690 | 4/1979 | Rich | 524/437 |
| 4,208,317 | 6/1980 | Cerny et al. | 524/80 |
| 4,247,446 | 1/1981 | Betts et al. | 524/412 |
| 4,255,319 | 3/1981 | Peters | 524/80 |
| 4,273,691 | 6/1981 | MacLaury et al. | 524/398 |
| 4,292,222 | 9/1981 | Grigo et al. | 524/269 |
| 4,331,733 | 5/1982 | Evans et al. | 524/437 |
| 4,430,470 | 2/1984 | Taniguchi et al. | 524/269 |

FOREIGN PATENT DOCUMENTS 56-93207 7/1981 Japan .

*Primary Examiner*—Veronica P. Hoke
*Attorney, Agent, or Firm*—Toren, McGeady, Stanger, Goldberg & Kiel

[57] ABSTRACT

The invention provides a polyolefin-based rubber composition capable of giving a vulcanizate having excellent flame retardancy along with high mechanical strengths. The composition comprises: (A) 100 parts by weight of a polyolefin-based synthetic rubber, e.g. EPDM rubber; (B) 1 to 100 parts by weight of an organopolysiloxane; (C) 1 to 100 parts by weight of a bromine-containing flame retardant agent and/or red phosphorus; (D) 5 to 200 parts by weight of aluminum hydroxide and/or magnesium hydroxide; and (E) 0.5 to 20 parts by weight of zinc carbonate and/or manganese carbonate.

7 Claims, No Drawings

4,560,719

FLAME RETARDANT POLYOLEFIN-BASED RUBBER COMPOSITION

BACKGROUND OF THE INVENTION

The present invention relates to a flame-retardant polyolefin-based rubber composition or, more particularly, to a polyolefin-based rubber composition imparted with excellent flame retardancy by the admixture of an organopolysiloxane.

Polyolefin-based synthetic rubbers in general are widely used as a material for electric insulation by virtue of their excellent electric and mechanical properties. A disadvantage in these synthetic rubbers is, however, their relatively high inflammability and, when they are once set on fire, the rubber sometimes is melted and drips to cause propagation of the flame. Therefore, it is a usual practice that a polyolefin-based rubber composition is formulated with various kinds of additives to be imparted with heat resistance and flame retardancy. In particular, a polyolefin-based rubber composition can be imparted with improved flame retardancy by formulating with a halogen compound and antimony oxide. The addition of these additives in large amounts is, however, accompanied by serious problems and disadvantages that the electric and mechanical properties of the rubber composition are adversely affected and, when a rubber composition admixed with these additives is set on fire, large volumes of toxic and corrosive gases are produced with little improvement in the phenomenon of dripping. Recently, it is proposed to formulate a polyolefin-based rubber composition with a large amount of aluminum hydroxide or magnesium hydroxide with an object to impart flame retardancy to the composition. This method of imparting flame retardancy, however, is not sufficiently effective unless the amount of the hydroxide is unduly increased while a rubber composition filled with such a large amount of the hydroxide has poor workability and the rubber article prepared of such a composition may have decreased mechanical strengths.

SUMMARY OF THE INVENTION

It is therfore an object of the present invention to provide a novel polyolefin-based rubber composition imparted with excellent flame retardancy without the above described problems and disadvantages in the prior art rubber compositions.

Thus, the flame-retardant polyolefin-based rubber composition of the present invention comprises:

(A) 100 parts by weight of a polyolefin-based synthetic rubber;

(B) from 1 to 100 parts by weight of an organopolysiloxane;

(C) from 1 to 10 parts by weight of a bromine-containing flame retardant agent and/or red phosphorus;

(D) from 5 to 200 parts by weight of aluminum hydroxide and/or magnesium hydroxide; and (E) from 0.5 to 20 parts by weight of zinc carbonate and/or manganese carbonate.

DETAILED DESCRIPTION OF THE PREFERRED EMBODIMENTS

The polyolefin-based synthetic rubber, i.e. the component (A), as the principal constituent of the inventive composition is a rubbery polymer known in the art of synthetic rubbers and exemplified by copolymers of ethylene and propylene, ternary copolymers of ethylene, propylene and a dienic monomer, copolymers of ethylene and methyl acrylate, copolymers of ethylene and ethyl acrylate, copolymers of ethylene and vinyl acetate, copolymers of acrylonitrile and butadiene, copolymers of isobutylene and isoprene and the like. When a heat-shrinkable rubber composition is desired, these rubbery polymers may be blended with a thermoplastic resin such as polyethylene, polypropylene, polypentene, copolymers of ethylene and butene and the like to form a composite polymer blend.

The organopolysiloxane as the component (B) in the inventive rubber composition has a chemical composition represented by the general formula $(SiO_2)_p(RSiO_{1.5})_q(R_2SiO)_r(R_3SiO_{0.5})_s$, in which each R is, independently from the others, a group selected from the class consisting of substituted and unsubstituted monovalent hydrocarbon groups including alkyl groups such as methyl, ethyl, propyl and butyl groups, alkenyl groups such as vinyl and allyl groups, aryl groups such as phenyl and tolyl groups, cycloalkyl groups such as cyclohexyl group and those substituted groups obtained by the replacement of all or a part of the hydrogen atoms in the above named hydrocarbon groups with substituent atoms or groups such as halogen atoms, cyano groups, mercapto groups and the like as exemplified by chloromethyl, fluoropropyl, cyanomethyl and mercaptomethyl groups, alkoxy groups such as methoxy, ethoxy and propoxy groups and a hydroxy group and the suffixes of p, q, r and s are each zero or a positive integer independently from the others, not all of them being simultaneously zero as a matter of course. It is preferable that at least a part of the groups denoted by R in a molecule are functional groups such as vinyl and mercaptoalkyl groups. The molecular configuration of the organopolysiloxane may be substantially linear, cyclic or three-dimensionally networked. For example, such a linear diorganopolysiloxane can be obtained usually be the ring-opening polymerization of a cyclic organopolysiloxane such as hexamethyl cyclotrisiloxane, octamethyl cyclotetrasiloxane and the like by use of an acid or alkali catalyst in the presence of a controlled amount of a hexaorgano disiloxane, e.g. hexamethyl disiloxane, or water to provide the terminal groups of the diorganopolysiloxane molecules. The average degree of polymerization can be controlled by suitably selecting the amount of the hexaorgano disiloxane or water. In the inventive composition, the diorganopolysiloxane as the component (B) should preferably have an average degree of polymerization, i.e. the average number of silicon atoms in a molecule, of at least 100 or, more preferably, at least 1000 so that the diorganopolysiloxane has a relatively high viscosity. As is mentioned before, it is preferable that the organopolysiloxane has vinyl groups, mercapto groups and the like functional groups in the molecule so as to increase the crosslinking density formed in the course of curing.

Alternatively, an organopolysiloxane resin having a branched molecular structure also can be used as the component (B) in the inventive rubber composition. Such an organopolysiloxane resin can be prepared by the (co)hydrolysis of a trifunctional hydrolyzable organosilane compound, such as methyl trichlorosilane, phenyl trichlorosilane, methyl trimethoxysilane, phenyl trimethoxysilane, vinyl trichlorosilane and the like or tetrafunctional hydrolyzable silane compound such as silicon tetrachloride and tetraethoxysilane as well as sodium silicate with admixture of a mono- or difunctional hydrolyzable organosilane compound, such as dimethyl dichlorosilane, methyl vinyl dichlorosilane, trimethyl chlorosilane, dimethyl diemthoxysilane and the like followed by the removal of the acid produced by the reaction and, if necessary, the polymerization reaction. A preferable organopolysiloxane resin is composed of the tetrafunctional siloxane units of the formula SiO and monofunctional siloxane units of the formula $R_3SiO_{0.5}$, R being typically a monovalent hydrocarbon group, in a molar ratio in the range from 0.6 to 1.5. The organopolysiloxane is liquid or solid at room temperature. Each of the terminal groups at the molecular chain ends is a silanolic hydroxy or an alkoxy group. Such an organopolysiloxane resin also can be used in combination with the above described linear diorganopolysiloxane as the component (B).

The amount of the organopolysiloxane as the component (B) in the inventive rubber composition should be in the range from 1 to 100 parts by weight or, preferably, from 5 to 50 parts by weight per 100 parts by weight of the polyolefin-based rubber in view of the balance between the flame retardancy and the mechanical properties of the rubber composition. That is, the flame retardancy of the composition is unsatisfactory when the amount of the organopolysiloxane is smaller than the above range while the mechanical strength of the rubber composition after curing may be decreased by the formulation of the organopolysiloxane in an amount in excess of the above range.

The component (C) added to the inventive rubber composition is a bromine-containing flame retardant agent which may be any of known ones including, for example, decabromodiphenyl, tetrabromobisphenol A, tetrabromobisphenol S, tetrabromobisphenol A-bis(2-hydroxyethyl ether), octabromodiphenyl ether, pentabromodiphenyl ether, hexabromocyclododecane, pentabromophenol, tribromophenol, ethylene bis(tetrabromophthalimide), pentabromoethyl benzene, tetrabromophthalic anhydride, decabromodiphenyl ether and the like. Alternatively, the component (C) may be red phosphorus. Although red phosphorus as such can be added to the rubber composition, it is sometimes advantageous to use a fine powder of red phophorus coated on the particle surface with a phenolic resin or the like coating material to improve the dispersibility in the polyolefin-based rubber. Such a red phosphorus product is commercially available under a tradename of, for example, Novared #120 (a product by Phosphorus Chemical Co.). It is of course optional to use red phosphorus in combination with the above mentioned bromine compounds.

The amount of the component (C), which is a known flame retardant agent, in the inventive rubber composition should be in the range from 1 to 100 parts by weight or, preferably, from 5 to 50 parts by weight per 100 parts by weight of the polyolefin-based rubber as the component (A). When the amount of the component (C) is smaller than the above range, no sufficient flame retardant effect can be obtained as a matter of course. When the amount is excessively large, on the other hand, the rubber-like properties of the resultant composition are greatly affected.

The component (D) added to the polyolefin-based rubber composition of the invention is aluminum hydroxide, magnesium hydroxide or a combination thereof. These hydroxides are known materials as a flame retardant agent in a variety of organic polymeric resins and exhibit excellent effect of flame retardancy when used in combination with the above mentioned halogen-containing compounds or red phosphorus as the principal flame retardant agent. The amount of addition of the component (D) should be in the range from 5 to 200 parts by weight or, preferably, from 5 to 100 parts by weight per 100 parts by weight of the polyolefin-based rubber as the component (A). When the amount is smaller than 5 parts by weight, the flame retardancy of the composition would be insufficient while an excessively large amount of the component (D) is undesirable due to the unpractically decreased mechanical properties or, in particular, mechanical strengths as well as decreased electric properties of the resultant rubber composition.

The component (E) added to the inventive rubber composition is zinc carbonate, manganese carbonate or a combination thereof and exhibits a great improvement synergistically in the flame retardancy when used in combination with the organopolysiloxane as the component (B). The amount of the component (E) should be in the range from 0.5 to 20 parts by weight or, preferably, from 3 to 10 parts by weight per 100 parts by weight of the polyolefin-based synthetic rubber as the component (A).

Although each of the components (A) to (E) comprised in the inventive rubber composition is not novel, the combination thereof as disclosed here can give a rubber composition having excellent mechanical strengths with low overall loading of the additives, in particular, with a great decrease in the amount or complete elimination of halogen-containing additives. Furthermore, the organopolysiloxane as the component (B) serves to render the surface of an inorganic filler hydrophobic contributing greatly to the inprovement of the electric properties or, in particular, of the electric properties after dipping of the rubber article shaped of the inventive rubber composition in water in addition to the effect to suppress dripping of and to impart flame retardancy to the rubber composition.

The rubber composition of the invention is prepared by uniformly blending and kneading the above described components (A) to (E) in a conventional blending machine for rubber processing such as a Banbury mixer, kneader, two-roller mill and the like. It is of course optional that the inventive rubber composition is admixed with various kinds of additives conventionally used in rubber compositions including, for example, reinforcing and non-reinforcing fillers, pigments, crosslinking agents, various types of carbon-functional silane compounds, crosslinking accelerators, aging retarders, antioxidants, ultraviolet absorbers, softeners, molding aids and the like according to need. Formulation of antimony trioxide is preferable as an auxiliary flame retardant agent to further increase the flame retardancy. Addition of a process oil to the composition is effective to increase the extendability of the composition with improved workability on a roller mill.

Curing of the inventive rubber composition can be effected in any of known curing methods including formulation of a curing agent such as an organic peroxide, sulfur, sulfur-containing vulcanizing agent and the like and irradiation with a high-energy ionizing radiation such as electron beams. The organic peroxides suitable as a curing agent include dicumyl peroxide, di-tert-butyl peroxide, tert-butyl cumyl peroxide, 2,5-dimethyl-2,5-di(tert-butylperoxy) hexane, 2,5-dimethyl-2,5-di(tert-butylperoxy) hexyne, 3,1,1-bis-tert-butylperoxy-3,3,5-trimethyl cyclohexane and the like and one of the typical sulfur-containing vulcanizing agents is dipentamethylene thiuram tetrasulfide. It is of course that, when blending and kneading of the composition is performed at an elevated temperature according to need, these curing agents should be added to the composition after the temperature thereof has decreased below the decomposition temperature of the curing agent.

In the following, the rubber composition of the present invention is described in more detail by way of examples, in which the expression of "parts" in each occurrence refers to "parts by weight" and the symbols Me and Vi each denote a methyl and a vinyl group, respectively.

EXAMPLE 1 and Comparative Examples 1 to 4

A rubber compound was prepared by uniformly blending, in a pressurizable kneader, 100 parts of an EPDM-type polyolefin-based synthetic rubber (EP 43, a product by Nippon EP Rubber Co.), 10 parts of a silicone resin composed of two types of monofunctional organosiloxane units of the formulas $Me_3SiO_{0.5}$ and $ViMe_2SiO_{0.5}$ and tetrafunctional siloxane units of the formula $SiO_2$ in a molar ratio of the units of the former type to the units of the latter type of 0.7:1.0, in which the content of the vinyl groups was 3% by moles of the overall organic groups, 10 parts of a red phophorus product (Novared #120, supra), 80 parts of aluminum hydroxide (Hidilite H42M, a product by Showa Light Metal Co.) and 5 parts of zinc carbonate followed by the admixture of 2.8 parts of dicumyl peroxide. The rubber compound was shaped into sheets having a thickness of 1 mm and 2 mm by compression molding at 170° C. for 10 minutes under a pressure of 100 kg/cm$^2$ and the thus cured rubber sheets were subjected to the test for the flame retardancy according to the method of vertical burning test specified in the UL Specification to give the results shown in Table 1 given below.

For comparison, four sets of cured rubber sheets were prepared in the same manner as above excepting the omission of zinc carbonate (Comparative Example 1), omission of the silicone resin and zinc carbonate and decrease of the amount of the aluminum hydroxide to 50 parts (Comparative Example 2), omission of the silicone resin, red phosphorus and zinc carbonate and increase of the amount of the aluminum hydroxide to 120 parts (Comparative Example 3) and omission of the silicone resin and replacement of the aluminum hydroxide with the same amount of a fine quartz powder having an average particle diameter of 5 μm (Comparative Example 4). The results of the flame retardancy tests undertaken with these comparative rubber sheets are also shown in Table 1.

TABLE 1

|  |  | Example | Comparative Example |  |  |  |
|---|---|---|---|---|---|---|
|  |  | 1 | 1 | 2 | 3 | 4 |
| 1 mm-thick sheet | UL 94 test | 94V-0 | 94V-2 | Complete burning | Complete burning | Complete burning |
|  | Dripping | No | No | Yes | Yes | No |
| 2 mm-thick sheet | UL 94 test | 94V-0 | 94V-1 | Complete burning | Complete burning | Complete burning |
|  | Dripping | No | No | Yes | Yes | No |

EXAMPLE 2 and Comparative Examples 5 to 7

A rubber compound was prepared by uniformly blending, in a two-roller mill, 70 parts of an EPDM-type polyolefin-based synthetic rubber (EPT 3045, a product by Mitsui Petroleum Chemical Co.), 25 parts of a methyl vinyl polysiloxane fluid having an average degree of polymerization of about 800 and composed of 99.5% by moles of the units $Me_2SiO$ and 0.5% by moles of the units ViMeSiO with terminal silanolic hydroxy groups at the molecular chain ends, 5 parts of the same silicone resin as used in Example 1, 10 parts of a precipitated silica filler having a specific surface area of 230 m$^2$/g (Nipsil VN$_3$, a product by Nippon Silica Co.), 20 parts of decabromodiphenyl ether, 30 parts of aluminum hydroxide (Hidilite H42M, supra), 5 parts of zinc carbonate and 10 parts of antimony trioxide followed by the admixture of 2.8 parts of dicumyl peroxide. The rubber compound was shaped and cured into a sheet of 1 mm thickness by compression molding at 170° C. for 10 minutes under a pressure of 100 kg/cm$^2$ followed by the post-curing at 150° C. for 2 hours. The flame retardancy test of the thus cured rubber sheet was undertaken in the same manner as in the preceding example to give the results shown in Table 2 below.

For comparison, three comparative rubber sheets were prepared in the same manner as above excepting the increase of the amount of the EPDM rubber to 100 parts, the amount of decabromodiphebyl ether to 40 parts and the amount of antimony trioxide to 20 parts and omission of the silicones and zinc carbonate (Comparative Example 5), increase of the amount of the EPDM rubber to 100 parts and omission of the silicones (Comparative Example 6) and omission of decabromodiphenyl ether, zinc carbonate and antimony trioxide (Comparative Example 7). These comparative rubber sheets were subjected to the same flame retardancy test as above to give the results shown in Table 2.

TABLE 2

|  |  | Example | Comparative Example |  |  |
|---|---|---|---|---|---|
|  |  | 2 | 5 | 6 | 7 |
| 1 mm-thick sheet | UL 94 test | 94V-0 | 94V-2 | Complete burning | Complete burning |
|  | Dripping | No | Yes | Yes | No |

EXAMPLE 3 to 5 and Comparative Example 8

Rubber compounds were prepared each by uniformly blending, in a two-roller mill, 100 parts of the same EPDM rubber as used in Example 2, 10 parts of a silicone resin composed of monofunctional methyl vinyl siloxane units and tetrafunctional siloxane units in a molar ratio of 0.7:1.0, of which the molar ratio of the vinyl to methyl groups was 1:2 (Example 3), a silicone resin composed of the trifunctional organoposiloxane units alone, of which the molar ratio of phenyl to methyl groups was 3:7 (Example 4) or a silicone resin composed of the $MeSiO_{1.5}$ units alone (Example 5), 5 parts of the same precipitated silica filler as used in the preceding example, 20 parts of decabromodiphenyl ether, 30 parts of the same aluminum hydroxide product as used in the preceding example, 5 parts of manganese carbonate and 15 parts of a paraffinic process oil (Sunpar 2280, a product by Nippon Sun Petroleum Co.) followed by the admixture of 2.8 parts of dicumyl peroxide. Each of these rubber compounds was shaped and cured into a sheet of 2 mm thickness by compression molding at 170° C. for 10 minutes under a pressure of 100 kg/cm². The thus cured rubber sheets were subjected to the test of the flame retardancy in the same manner as in the preceding examples along with measurements of the mechanical properties to give the results shown in Table 3 below.

For comparison (Comparative Example 8), a comprative rubber sheet was prepared in the same manner as above excepting the omission of the silicone resin and zinc carbonate and subjected to the test of the flame retardancy and measurements of the mechanical properties to give the results also shown in Table 3.

TABLE 3

|  |  | Example | | | Comparative Example |
|---|---|---|---|---|---|
|  |  | 3 | 4 | 5 | 8 |
| UL 94 test (2 mm) | | 94V-0 | 94V-0 | 94V-0 | Complete burning |
| Mechanical properties | Hardness (JIS) | 58 | 60 | 61 | 58 |
| | Tensile strength, kg/cm² | 90 | 85 | 75 | 80 |
| | Ultimate elongation, % | 400 | 410 | 450 | 400 |

EXAMPLE 6 and Comparative Example 9

A rubber compound was prepared by uniformly blending 70 parts of a copolymer of ethylene and vinyl acetate (Evethrene 420-P, a product by Dai-Nippon Ink Chemical Co.), 30 parts of a silicone gum having an average degree of polymerization of 6000 and composed of 99.5% by moles of the units of the formula Me$_2$SiO and 0.5% by moles of the units of the formula ViMeSiO, 20 parts of the same precipitated silica filler as used in Example 2, 20 parts of decabromodiphenyl ether, 30 parts of the same aluminum hydroxide as used in Example 2, 10 parts of zinc carbonate, 10 parts of antimony trioxide and 10 parts of the same paraffinic process oil as used in Example 3. The thus prepared rubber compound was shaped and cured into a sheet of 1 mm thickness which was subjected to the test of the flame retardancy to find that the result of the UL 94 test was 94V-0 with no dripping.

For comparison, (Comparative Example 9), the same preparation and test of the flame retardancy as above were undertaken excepting the omission of the silicone gum and zinc carbonate in the formulation of the rubber compound to find that the result of the UL 94 test was 94V-2 with dripping.

EXAMPLE 7 and Comparative Examples 10 and 11

A rubber compound was prepared by uniformly blending, in a two-roller mill, 100 parts of the same EPDM rubber as used in Example 1, 10 parts of the same silicone resin as used in Example 1, 10 parts of the same red phosphorus product as used in Example 1, 90 parts of magnesium hydroxide (#200, a product by Kamishima Chemical Co.) and 5 parts of manganese carbonate followed by the admixture of 2.8 parts of dicumyl peroxide. The thus prepared rubber compound was shaped and cured into a rubber sheet of 2 mm thickness by compression molding at 170° C. for 10 minutes under a pressure of 100 kg/cm² and subjected to the test of the flame retardancy to give the results shown in Table 4 below.

For comparison, two comparative rubber sheets were prepared in the same formulation as above excepting the omission of manganese carbonate (Comparative Example 10) or omission of the silicone resin (Comparative Example 11) and subjected to the test of the flame retardency to give the results shown in Table 4 below.

TABLE 4

|  |  | Example | Comparative Example | |
|---|---|---|---|---|
|  |  | 8 | 10 | 11 |
| Formulation, parts | EPDM rubber | 100 | 100 | 100 |
| | Silicone resin | 10 | 10 | — |
| | Red phosphorus | 10 | 10 | 10 |
| | Magnesium hydroxide | 90 | 90 | 90 |
| | Manganese carbonate | 5 | — | — |
| | Dicumyl peroxide | 2.8 | 2.8 | 2.8 |
| UL 94 test, 2 mm sheet | | 94V-0 | 94V-1 | Complete burning |
| Dripping | | No | No | No |

What is claimed is:

1. A flame-retardant polyolefin-based rubber composition which comprises:
   (A) 100 parts by weight of a polyolefin-based synthetic rubber;
   (B) from 1 to 100 parts by weight of an organopolysiloxane;
   (C) from 1 to 100 parts by weight of a bromine-containing flame retardant agent or red phosphorus;
   (D) from 5 to 200 parts by weight of aluminum hydroxide or magnesium hydroxide; and
   (E) from 0.5 to 20 parts by weight of zinc carbonate or manganese carbonate.

2. The flame-retardant polyolefin-based rubber composition as claimed in claim 1 wherein the organopolysiloxane is a diorganopolysiloxane having a substantially linear molecular structure having an average degree of polymerization of at least 100.

3. The flame-retardent polyolefin-based rubber composition as claimed in claim 1 wherein the organopolysiloxane is a resinous organopolysiloxane composed of tetrafunctional siloxane units and monofunctional siloxane units in a molar ratio in the range from 0.6 to 1.5.

4. The flame-retardant polyolefin-based rubber composition as claimed in claim 1 wherein the amount of the component (B) is in the range from 5 to 50 parts by weight per 100 parts by weight of the component (A).

5. The flame-retardant polyolefin-based rubber composition as claimed in claim 1 wherein the amount of the component (C) is in the range from 5 to 50 parts by weight per 100 parts by weight of the component (A).

6. The flame-retardant polyolefin-based rubber composition as claimed in claim 1 wherein the amount of the component (D) is in the range from 50 to 100 parts by weight per 100 parts by weight of the component (A).

7. The flame-retardant polyolefin-based rubber composition as claimed in claim 1 wherein the amount of the component (E) is in the range from 3 to 10 parts by weight per 100 parts by weight of the component (A).

* * * * *